United States Patent [19]

Reneau

[11] Patent Number: 4,840,209
[45] Date of Patent: Jun. 20, 1989

[54] ROUTER GUIDE ASSEMBLY AND METHOD OF USING SAME

[76] Inventor: Raymond P. Reneau, 5844 Sampley Way, Houston, Tex. 77092

[21] Appl. No.: 166,260

[22] Filed: Mar. 10, 1988

[51] Int. Cl.<sup>4</sup> ............................ B27M 1/00; B27C 5/10
[52] U.S. Cl. ................................. 144/371; 144/134 D; 144/136 C; 409/182
[58] Field of Search ................................ 409/178, 182; 144/134 R, 134 D, 136 R, 136 C, 137

[56] References Cited

U.S. PATENT DOCUMENTS

| | | | |
|---|---|---|---|
| 2,752,961 | 7/1956 | Melgaard | 144/134 D |
| 3,402,640 | 9/1968 | Eisenbach | 409/178 |
| 3,450,001 | 6/1969 | Fortune | 90/12 |
| 3,770,031 | 11/1973 | Olson | 144/136 |
| 3,923,086 | 12/1975 | Spohn, Jr. | 144/134 |
| 4,434,824 | 3/1984 | Bussey | 144/134 |
| 4,630,656 | 12/1986 | Collins | 144/134 D |
| 4,630,657 | 12/1986 | Obradovich | 144/134 D |

*Primary Examiner*—W. Donald Bray
*Attorney, Agent, or Firm*—Glaser, Griggs & Schwartz

[57] ABSTRACT

A router guide assembly for guiding a router over a workpiece for making a precise cut on the workpiece, including an elongate rail member, a router trolley mounted for movement along the length of the rail member with the router trolley supporting the router for cutting operations on the workpiece, and a securing member fixed to the rail member for securing the rail member with the workpiece.

28 Claims, 5 Drawing Sheets

ROUTER GUIDE ASSEMBLY AND METHOD OF USING SAME

FIELD OF THE INVENTION

The field of this invention relates to power tool accessories, particularly of the types of accessories used in association with router operations.

DESCRIPTION OF THE PRIOR ART

In the past, there have been a variety of jigs and apparatus used for the enhancement of router cutting operations. Typically, such devices have included various router guides that require the operator to maintain proper router guide contact by the operator pressing the router against the guide while the router rides on the surface of the workpiece in order to prevent wandering of the router during such cutting operations. This router wandering or any imperfections in the surface of the workpiece may result in unwanted cuts on the workpiece.

Indeed, in most instances, prior art devices rely upon clamping structures for securing the workpiece that are independent and apart from not only the router, but any mechanism used to either restrain router movement or to mount the router. Furthermore, to the extent that some of the prior art devices provide a plurality of rails for some type of router carriage, such devices do not comprehend the combined mounting of the rails with the workpiece itself to enhance the accuracy of the router cut, while simultaneously virtually eliminating the possibility of erroneous router cuts to the workpiece.

So far as known, there is no router guide assembly capable of securing the router for predetermined aligned movement, with such aligned movement being defined by a router being placed upon a router trolley and movable along the length of a rail member that is secured directly to the finished cut portion of the workpiece.

SUMMARY OF THE INVENTION

The present invention relates to a new and improved router guide assembly and method of using same, for guiding a router over a workpiece for making a precise cut on the workpiece, the assembly including an elongate rail member, a router trolley mounted for movement along the length of the rail member, the router trolley supporting the router for cutting operations on the workpiece, and a securing member affixed to the rail member for securing the rail member with the workpiece.

DESCRIPTION OF THE PREFERRED EMBODIMENT

Figure 1:
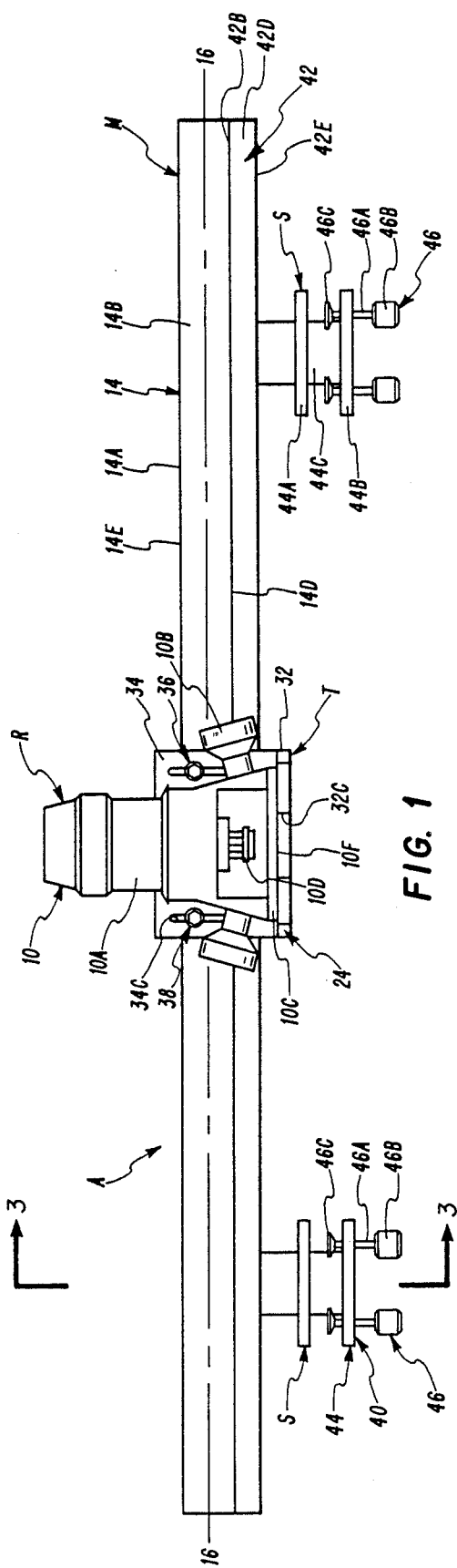
FIG. 1 is an elevational view of the router guide assembly of the present invention.

As best seen in the drawings, the present invention relates to a new and improved router guide assembly A for guiding a router R over a workpiece W for making a precise cut on the workpiece W. Generally speaking, the router guide assembly A of the present invention includes an elongate rail member M, a router trolley T and a securing member S. Preferably, the router guide assembly A is configured such that the router trolley T is mounted for movement along the length of the rail member M, with the router trolley T supporting the router R for cutting operations on the workpiece W. The securing member S is affixed with the rail member M for securing the rail member M with the workpiece W. Preferably, the components of this invention are made of steel, aluminum, or other high-strength materials capable of taking the stresses and strains particularly encountered in workpiece support and router operations.

Figure 4:
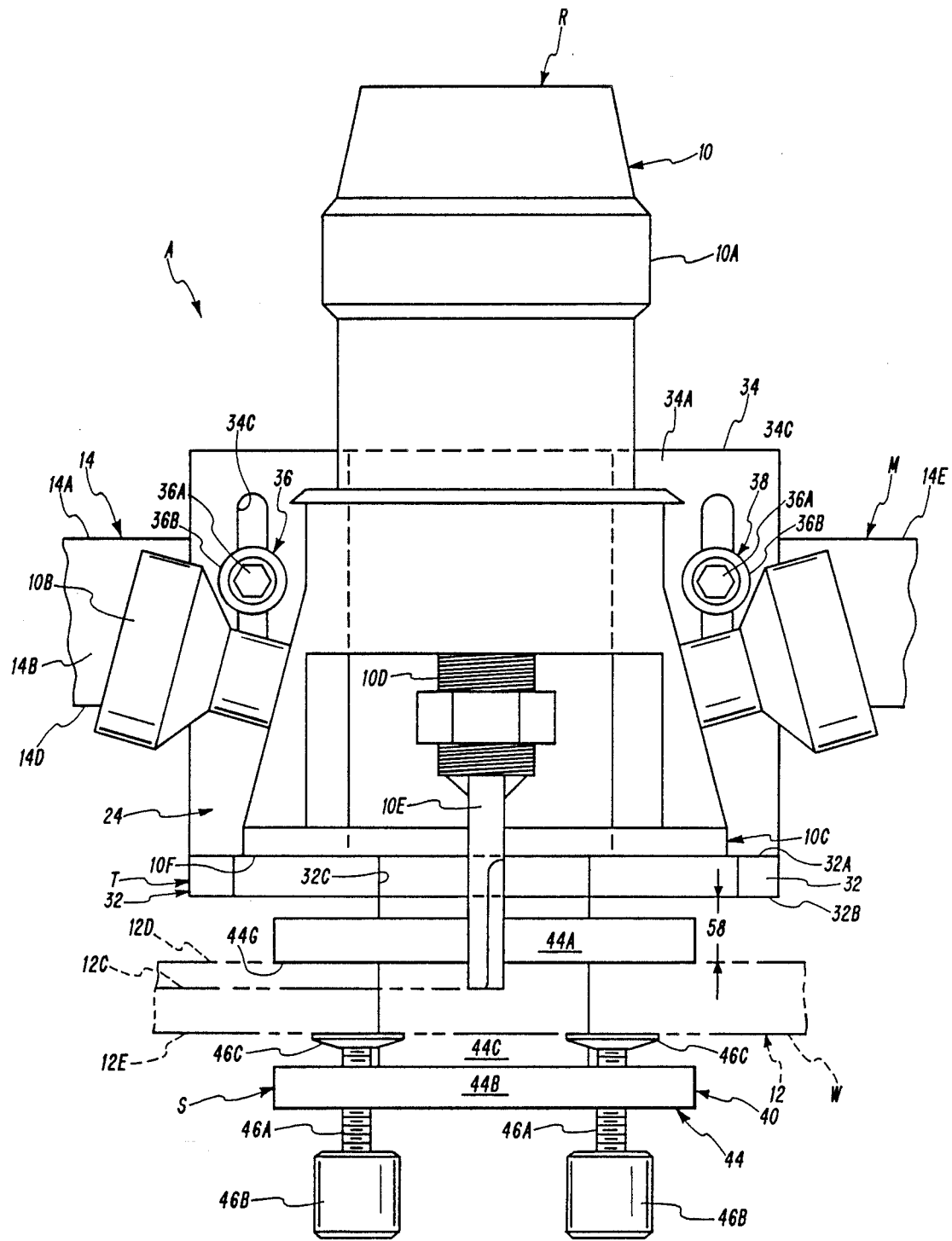
FIG. 4 is an enlarged, front elevational view of the router guide assembly of the present invention taken along the lines 4—4 of FIG. 2.

The router guide assembly A of the present invention is to be used in conjunction with a router R which may include many different, commercially available units such as those manufactured by Porter-Cable, Black & Decker, Bosch, Dremel, Milwaukee and Hitachi, by way of example and not by way of limitation. As is well known in the art, a router R typically includes router 10 having a housing 10a, guide knob 10b, router base 10c, with a typical collar type chuck 10d adapted to receive a suitable router bit 10e (FIG. 4). Typically, as is known in the art, such a router 10 includes a suitable depth adjustment feature (not shown) which permits precise, incremental, vertical adjustments of the router bit 10e with respect to the housing 10a of the router to result in precise depth of cut regulation. The router 10 is preferably used for making a precise machine-cut on a workpiece W.

The workpiece W includes workpiece 12 (FIG. 3) which typically is of wood, plastic or other light materials susceptible to effective router operations. In the event of a complete cut by the router R, the workpiece 12 results in a finished cut portion 12a and a discard portion 12b. In the event that the router R does not make a complete cut through the workpiece 12, then a suitable router groove 12c is formed in the workpiece 12 (FIG. 4). As such, the router groove 12c is formed typically between the upper surface 12d and the lower surface 12e of the workpiece 12. The workpiece 12 further includes side surfaces 12f (FIG. 3), as discussed below more fully.

Figure 2:
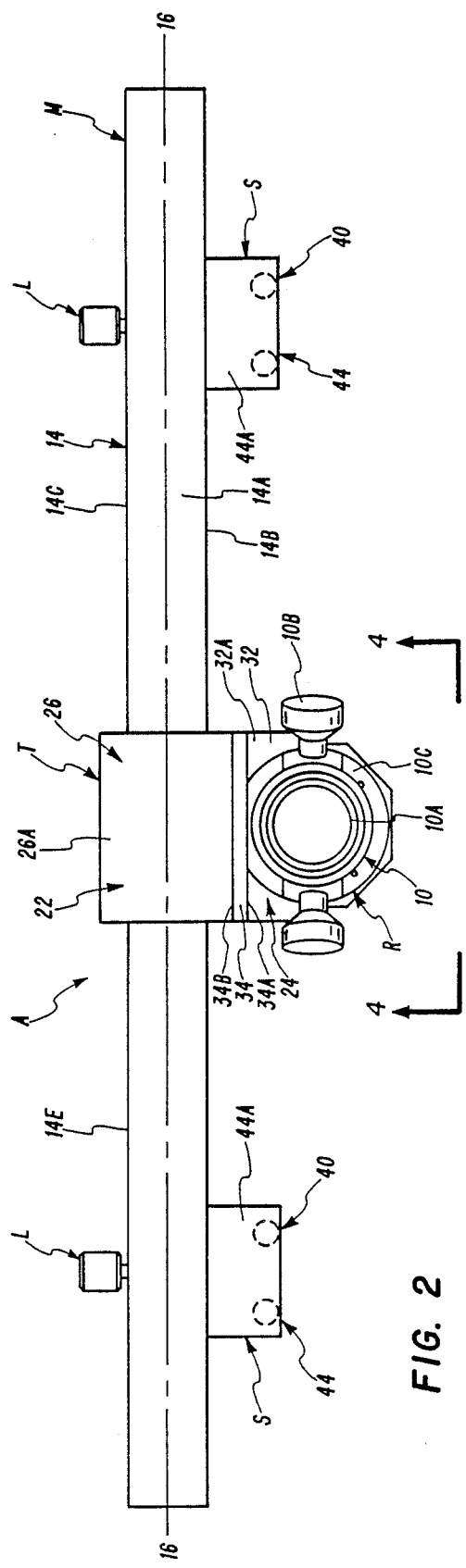
FIG. 2 is a plan view of the router guide assembly of the present invention, as shown in FIG. 1.
Figure 3:
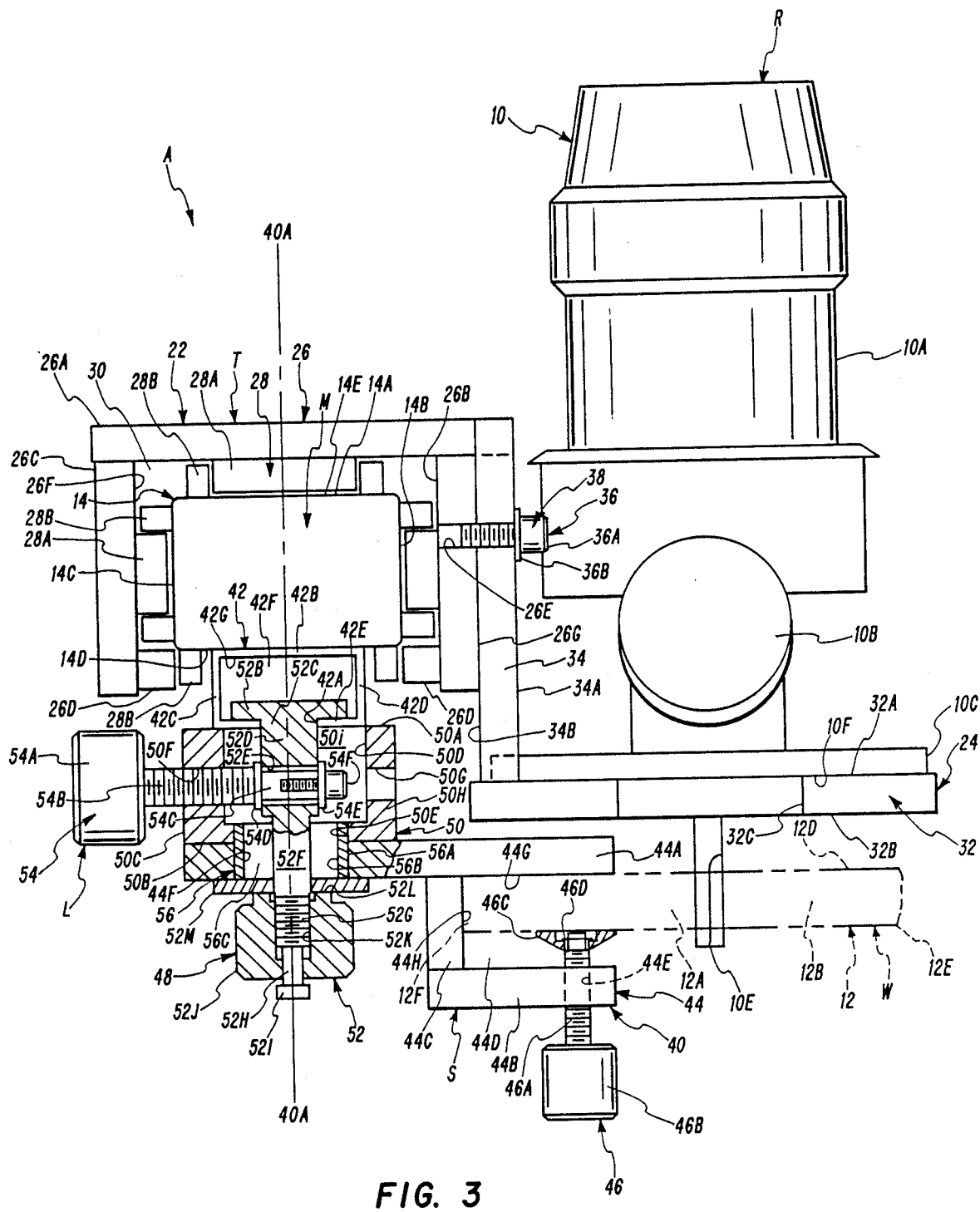
FIG. 3 is a sectional, side elevational view of the router guide assembly of the present invention, taken along the lines 3—3 of FIG. 1.
Figure 5:
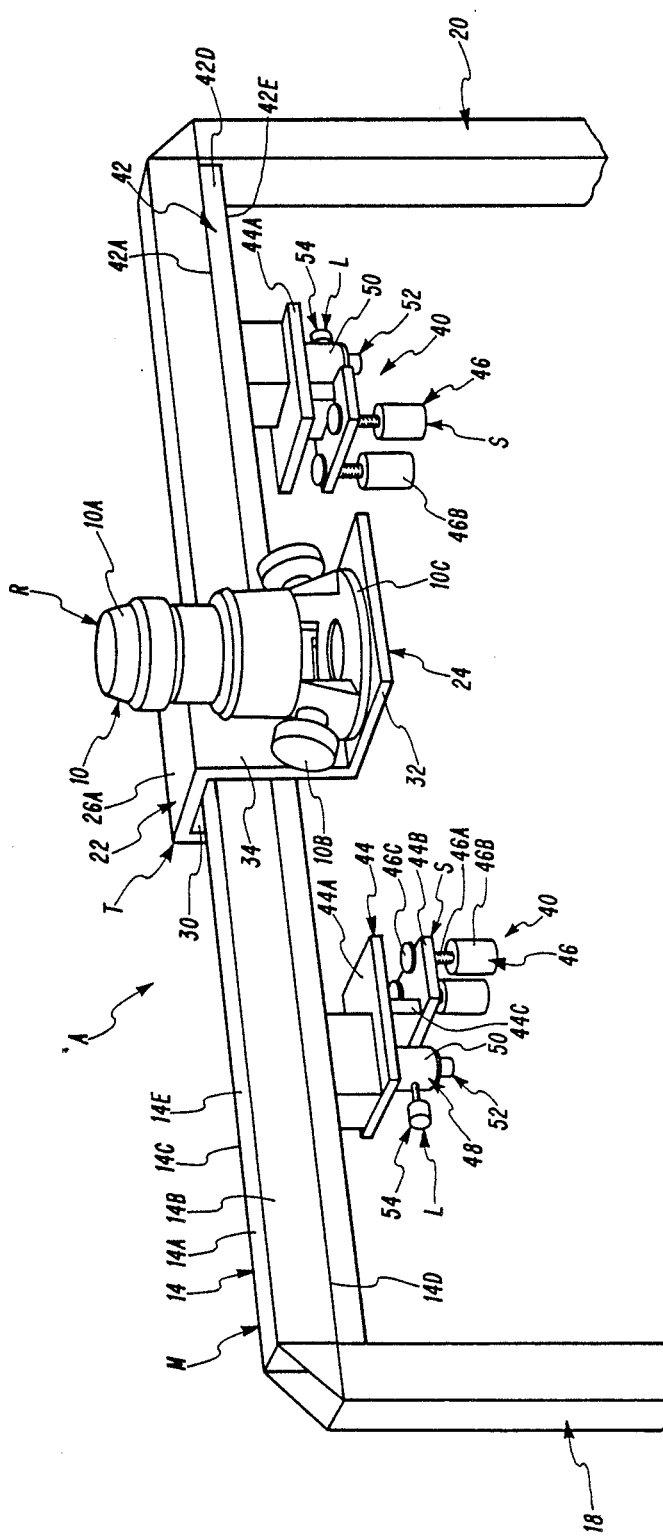
FIG. 5 is a perspective, generally elevational view showing the router guide assembly of the present invention as mounted on supports.
Figure 6:
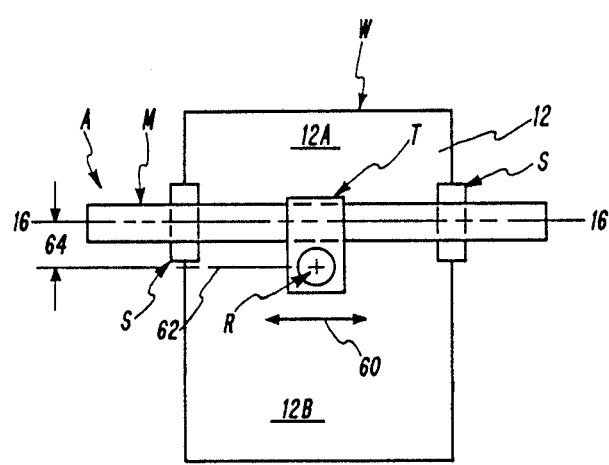
FIGS. 6 through 9 are schematic plan views of the router guide assembly of the present invention variously positioned with respect to the workpiece upon which router operations are to be performed; and, FIGS. 10 and 11 are alternative cross-sectional configurations of the rail member and router trolley of the router guide assembly of the present invention.

The router guide assembly A of the present invention includes a rail member M that is preferably elongate and includes rail member 14. As best seen in FIG. 3, the rail member 14 is preferably of a substantially rectangular cross-section in the plane that is substantially perpendicular to its length, with its length lying along the longitudinal axis 16 (FIGS. 1, 2). Preferably, the rail member 14 includes an upper surface 14a, side surfaces 14b, 14c and a lower surface 14d and may be of a generally hollow or solid configuration as the needs for use of the router guide assembly A of the present invention dictate. Although as depicted in the drawings as being of a generally rectangular configuration and cross-section, the rail member 14 may be of other suitable configurations which may include a generally circular cross-section, triangular cross-section, or other multi-sided configurations as may be dictated by the particular applications required (See FIGS. 10, 11 and discussion hereinbelow). As shown in FIG. 5, the rail member 14 may be supported by rail member supports 18, 20, which may be freestanding or permanently affixed to some structure (not shown) as a particular application of the router guide assembly A may require.

The router guide assembly A of the present invention further includes a router trolley T mounted for movement along the length of the rail member M. The router trolley T supports the router R for cutting operations on the workpiece W. The router trolley T includes generally, a trolley member 22 and a router support 24. The trolley member 22 is adapted to be aligned with and for movement along the rail member M while the router support 24 is secured with the trolley member 22 for receiving the router R for mounting therewith. The trolley member 22, as best seen in FIG. 3, includes a trolley member housing 26 and bearing means 28. Preferably, the trolley member housing includes an upper surface member 26a, side surface members 26b, 26c, lower surface member 26d, with the trolley member housing 26 mounted about the rail member M for movement along the length of the rail member M. Preferably, the interior surfaces of the upper surface member 26a, side surface members 26b, 26c and lower surface member 26d define a cavity 30 (FIG. 3) capable of receiving the rail member M therein. Bearing means 28, including bearing supports 28a and bearing members 28b, are mounted with the interior surfaces 26f of the trolley member housing 26 such that the bearing supports 26a are secured with the interior surfaces 26f of the trolley member housing 26 with the bearing members 28b being in engageable contact with the exterior surfaces 14e of the rail member 14 of the rail member M. As such, the bearing means 28 is mounted with the trolley member housing 26 while being interposed between the trolley member housing 26 and the rail member M for enhanced aligned movement of the trolley member housing 26 along the rail member M. As best seen in FIG. 3, the bearing means 28 is positioned so as to be interposed between the upper surface 14a, side surfaces 14b, 14c, lower surface 14d and the upper surface member 26a, side surface members 26b, 26c, lower surface member 26d, respectively. As such, the trolley member housing 26 includes its upper surface member 26a positioned substantially parallel with the upper surface 14a of the rail member 14, the side surface member 26b positioned substantially parallel with side surface 14b, side surface member 26c positioned substantially parallel with side surface 14c and lower surface member 26d positioned substantially parallel with the lower surface 14d of the rail member 14.

The router trolley T of the router guide assembly A of the present invention includes router support 24 including platform 32 and wall member 34. The platform 32 preferably includes an upper platform surface 32a and a lower platform surface 32b, with the wall member 34 being fixed with the platform 32. The wall member 34 includes a router side surface 34a and a trolley side surface 34b (FIG. 3). Preferably, the trolley side surface 34b is adapted to be positioned adjacent to the exterior surface 26g of side surface member 26b of the trolley member housing 26. As best seen in FIG. 4, preferably a pair of vertical slots 34c are formed in the wall member 34 extending through the wall member 34 between the router side surface 34a and trolley side surface 34b. A suitable fastening member 36, which may include a bolt 36a and washer 36b, is adapted to be positioned such that the bolt 36a is positioned through the vertical slot 34c into a compatibly formed threaded opening 26e formed in side surface member 26b of the trolley member housing 26. As such, the fastening member 36 and vertical slot 34c of the wall member 34 of the router support 24 form the adjustment mechanism 38 of the present invention. The adjustment mechanism 38 is designed to adjustably secure the router support 24 with the trolley member 22 for permitting relative vertically adjustable movement of the router support 24 with respect to the trolley member 22, for proper vertical positioning of the router R relative to the surface of the workpiece W as is desired. As such, the wall member 34 may be vertically positioned relative to the side surface member 26b of the trolley member housing 26. Upon proper positioning relative thereto, the adjustment mechanism 38 is activated in such a fashion that the fastener 36 is tightened for securing the wall member 34 with respect to the trolley member 22. As such, the adjustment mechanism 38 includes at least one threaded opening 26e formed in the trolley member housing 26 of the trolley member 22, at least one vertical slot 34c formed in the wall member 34 of the router support 24 for alignment with the threaded opening 26e and at least one fastening member 36 extensible through the vertical slot 34c and thereinto the threaded opening 26e for adjustably securing the router support 24 with respect to the trolley member 22.

As noted above, the platform 32 includes an upper platform surface 32a and a lower platform surface 32b with the router R adapted to be mounted with the upper platform surface 32a such that the lower surface 10f of the router base 10c of the router 10 is in contact with the upper platform surface 32a. The platform 32 is formed having an opening 32c extending between the upper and lower platform surfaces 32a, 32b for receiving the bit 10e of the router 10 of the router R therethrough, such that the bit 10e is extensible to a position beyond the lower platform surface 32b of the platform 32 for performing router operations on the workpiece W as discussed more fully hereinbelow.

The router guide assembly A of the present invention further includes a securing member S affixed to the rail member M for securing the rail member M with the workpiece W. The securing member S includes a clamp assembly 40 and a track 42. The clamp assembly 40 is mounted with the rail member M for securing the workpiece W with the rail member M. The clamp assembly 40 is rotatable about a vertical axis 40a that is substantially perpendicular to the horizontal plane along the length 16 of the rail member M.

The clamp assembly 40 includes a jaw member 44 capable of releasably securing the workpiece W. The jaw member 44 includes a first clamping portion 44a, a second clamping portion 44b and a third clamping portion 44c. Preferably, the first and second clamping portions 44a, 44b are substantially parallel to one another with the second clamping portion 44b being secured to the first clamping portion 44a by third clamping portion 44c. The interior surfaces of the first, second and third clamping portions 44a, 44b, 44c define a jaw cavity 44d for receiving the workpiece W therein. A workpiece clamp 46 includes a threaded shaft 46a, a knob 46b attached to one end of the threaded shaft 46a and a foot 46c that is secured to the end of the threaded shaft 46a by means of snap ring 46d (FIG. 3). As such, the workpiece clamp 46 is threadedly mounted within threaded opening 44e formed in second clamping portion 44b of the jaw member 44. The workpiece clamp 46 is mounted for vertical movement with the second clamping portion 44b of the jaw member 44 and being movable between a first, unsecured position wherein the workpiece W is unsecured in the jaw cavity 44d (FIGS. 1, 2) and a second, secured position wherein the workpiece W is secured in the jaw cavity 44d (FIGS. 3, 4). Rotation of the knob 46b results in threaded movement of the threaded shank 46a with respect to the threaded opening 44e formed in second clamping portion 44b of jaw member 44 allowing for vertical movement of the workpiece clamp 46 with respect to the jaw member 44 as is desired. Upon placement of the workpiece W within the jaw cavity 44d, the workpiece clamp 46 is activated by rotation of the knob 46b so as to constrain the workpiece 12 such that the upper surface 12d of the workpiece 12 contacts the inner surface 44g of the first clamping portion 44a, while the side surface 12f preferably abuts the inner surface 44h of the third clamping portion 44c, with the foot 46c of the workpiece clamp 46 engaging the lower surface 12e of the workpiece 12 so as to secure contact of the upper and side surfaces 12d, 12f of the workpiece 12 with the interior surfaces 44g, 44h of the first and third clamping portions 44a, 44c of the jaw member 44, respectively.

The securing member S of the present member includes the track 42 mounted with the rail member M for receiving the clamp assembly 40. The clamp assembly 40 is adapted to be secured at selected positions along the length of the rail member M, as desired. The track 42, as best seen in FIG. 3, is preferably of a generally hollow cross-section in the plane perpendicular to the length of the longitudinal axis 16 of the rail member M. A track channel 42a is preferably formed in one side of the track 42 for receiving the clamp assembly 40 for mounting therewith at desired positions along the length of the rail member M. While the track 42 is depicted of a generally rectangular cross-sectional area (FIGS. 1-5), it should be understood that other suitable cross-sections may be utilized (see FIGS. 10, 11). As such, the track 42 (FIG. 3) includes an upper track portion 42b, side track portions 42c, 42d, and a lower track portion 42e having the track channel 42a formed therein. As such, the interior surfaces 42g of the track portions 42b, 42c, 42d, 42e define a track cavity 42f. Preferably, the track 42 is affixed to the lower surface 14d of rail member 14 at its upper track portion 42b so as to not interfere with the lower surface member 26d of the trolley member housing 26 and its associated bearing members 28b.

In addition to the jaw member 44 for releasably securing the workpiece W, the clamp assembly 40 of the router guide assembly A of the present invention further includes a locking mechanism 48. The locking mechanism 48 includes a lock housing 50 and a lock fastener 52, as best seen in FIG. 3. The lock housing 50 includes an upper surface 50a, a lower surface 50b, exterior surface 50c, interior surface 50d. Preferably, an opening 50e is formed in the lower surface 50b of the lock housing 50 with aligned openings 50f, 50g formed in the side portion 50h of the lock housing 50. The interior surface 50d of the lock housing defines a lock housing cavity 50i. As such, the lock housing 50 is adapted to be mounted between the jaw member 44 and the track 42, more specifically with the lower surface 50b of the lock housing 50 engaging the upper surface of the first clamping portion 44a, and the upper surface 50a of the lock housing 50 engaging the lower surface of the lower track portion 42e of the track 42.

The lock fastener assembly 52 of the locking mechanism 48 includes a head portion 52a having an inner track member 52b, a channel member 52c, a body member 52d, and an opening 52e formed in the body member 52d. The lock fastener assembly 52 further includes a shank 52f preferably affixed to the head portion 52a adjacent the lower end of the body member 52d. A threaded shaft 52g is aligned with the shank 52f and extensible therebelow, with a reduced rod 52h aligned therewith. A head 52i is formed at the lower end of the reduced rod 52h. A knob 52j is adapted to be fitted about the reduced rod 52h and engageable with the threaded shaft 52g by threaded action between the threaded bore 52k formed within the knob 52j. The knob 52j is further formed with an engaging surface 52l which is adapted to engage washer 52m, with the washer 52m adapted to be disposed between the knob 52j and surface 44g of the first clamping portion 44a of jaw member 44. Preferably, the inner track member 52b of the head portion 52 is adapted to be disposed within the cavity 42f of the track 42, with the channel member 52c of the head portion 52a adapted to be disposed within the channel 42a of the track 42. The body member 52e of the head portion 52a is adapted to be disposed within the cavity 50i formed in the lock housing 50, with the shank 52f adapted to be disposed within the opening 50e formed in lock housing 50 and opening 44f formed in jaw member 44.

The locking mechanism 48, including the lock housing 50 and the lock fastener assembly 52, is interposed between the jaw member 44 and the rail member 14 with the locking mechanism 48 being releasable between a locked position where the clamp assembly 40 is secured from relative movement with respect to the rail member M and an unlocked position where the clamp assembly 40 may rotate with respect to the rail member M. In this unlocked position, the clamp assembly 40 may rotate and swivel with respect to the rail member M. Furthermore, the lock fastener assembly 52 is mounted with the rail member M and extensible through the lock housing 50 with the jaw member 44 for movement thereof between the locked and unlocked positions.

The router guide assembly A of the present invention further includes a lateral adjustment mechanism L that is mounted with the securing member S for laterally adjusting the workpiece W with respect to the rail member M. The lateral adjustment mechanism L includes an adjusting rod 54, with the adjusting rod 54 including a knob 54a, a threaded shaft 54b, a reduced shaft 54c, thrust washers 54d, 54e and a suitable fastener 54f. The threaded shaft 54b is adapted to be positioned and threadedly engageable with threaded bore 50f of the lock housing 50, with the reduced shaft 54c positionable within the opening 52e formed in lock fastener assembly 52. A thrust washer 54d is positioned between the threaded shaft 54b and reduced shaft 54c while thrust washer 54e is positioned between the fastener 54f and the body member 52d of the lock fastener assembly 52. It should be appreciated that the fastener 54f is adapted to be positioned through opening 50g formed in the lock housing 50 during the assembly thereof. As such, the adjusting rod 54 is threadedly mounted with the lock housing 50 and in engagement with the lock fastener assembly 52 such that threaded rotation of the adjusting rod 54 with respect to the lock housing 50 shifts the jaw member 44 for lateral positioning of the workpiece W with respect to the rail member M and the router trolley T, as desired.

In addition to the adjusting rod 54, the lateral adjustment mechanism L of the present invention further includes a guide bushing 56. The guide bushing 56 includes an outer surface 56a, inner surface 56b, with the inner surface 56b defining an interior cavity 56c. The guide bushing 56 is positionable such that the outer surface 56a engages opening 50e of the lock housing 50 and opening 44f of the jaw member for proper positioning of the jaw member 44 with respect to the lock housing 50, with a portion of the lock fastener assembly 52 being positioned within the inner cavity 56c of the guide bushing 56. As such, the lock fastener assembly 52 is laterally movable within the inner cavity 56c of the guide bushing 56 upon threaded movement of the adjusting rod 54. Furthermore, the router guide assembly A of the present invention results in a relative positioning of the router R on the router trolley T with respect to the workpiece W resulting in the lower surface 32b of the platform 32 of the router support 24 being suspended from the upper surface 12d of the workpiece 12 of the workpiece W by a clearance gap 58 (FIG. 4).

Figure 10:
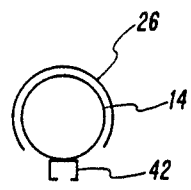
Figure 11:
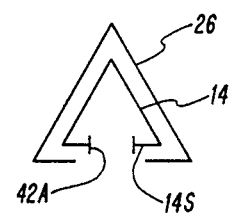

As discussed hereinabove, while the sectional configurations of the rail member M and track 42 are preferably of rectangular cross-sectional areas (FIGS. 1–5), alternative configurations are comprehended within the scope of this invention. For example, but not by way of limitation, as shown in FIG. 10, the rail member M could be formed of a circular cross-section, having the track 42 mounted adjacent the lower end thereof, with the trolley member housing 26 being compatibly formed thereabout the circular rail member 14. By way of an additional example, as shown in FIG. 11, the rail member 14 may be of a substantially triangular configuration with the configuration of the trolley member housing 26 conforming similarly thereto. In addition, a track 42 could be attached to the lower surface 14s of the triangular cross-section as shown in FIG. 10 or alternatively, the track channel 42a could be formed directly in the lower surface 14s of the triangular rail member 14 (FIG. 11), or in the lower surface of the cylindrical rail member 14 (FIG. 10) or in the lower surface 14d of the rectangularly shaped rail member 14 of FIGS. 1 through 5.

In the use and operation of the router guide assembly A of the present invention, the router guide assembly A may be secured to the workpiece W for making a precise cut, with the precise cut either being that of a groove such as groove 12c or a through-cut on the workpiece 12 resulting in a finished cut portion 12a and a discard portion 12b. In the event of the need of a finished cut (FIG. 3), it should be noted that the router guide assembly A of the present invention is secured to the finished cut portion 12a of the workpiece 12. The securing members S permit the orientation of the router guide assembly A in a variety of positions with respect to the workpiece for making any number of angled cuts on the workpiece W due primarily to the fact that the securing members S include the locking mechanism 48 which allows the jaw member 44 and workpiece clamp 46 to basically swivel to any desired position so as to position the rail member M and router trolley T in proper alignment for any desired cut to be made on the workpiece W by the router R.

Figure 8:
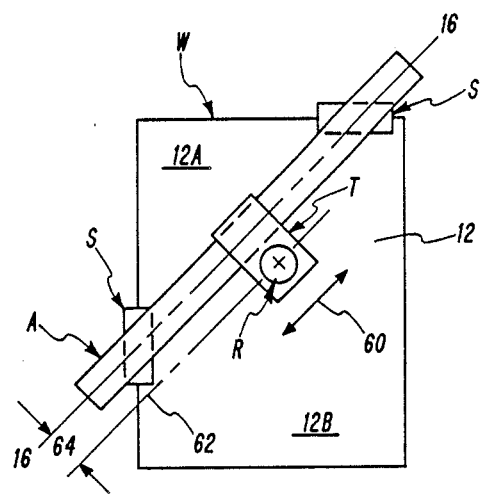
Figure 7:
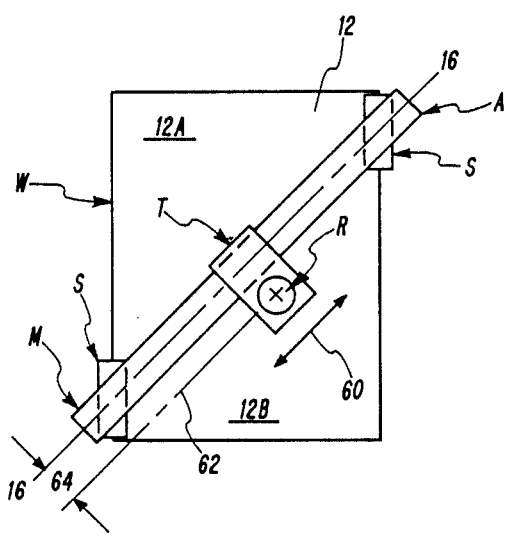
Figure 9:
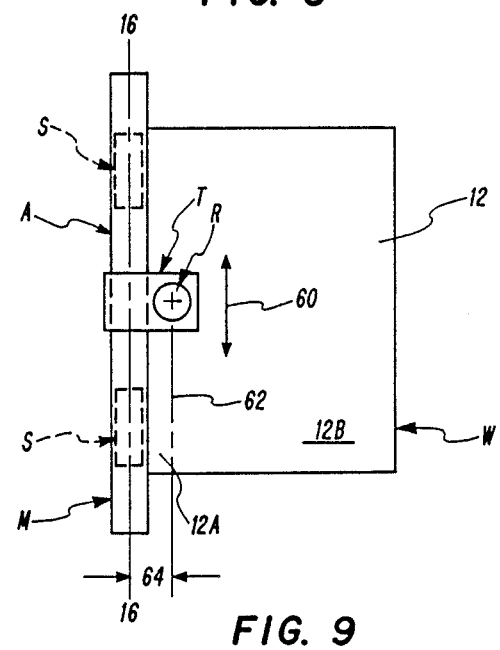

For example, as shown schematically in FIGS. 6, 7, 8 and 9, the router guide assembly A of the present invention may be positioned in a variety of cutting positions. As shown schematically in FIG. 6, the router guide assembly A of the present invention could be used for basically a square type cut with the securing members S being positioned substantially parallel to one another and perpendicular to the longitudinal axis 16 of the rail member M. As shown in FIG. 7, the router guide assembly A may make an angled cut upon the workpiece W noting that the securing members S still remain substantially parallel to one another yet at an angle with respect to the longitudinal axis 16 of the rail member M. As shown in FIG. 8, the securing members S are substantially perpendicular with respect to one another and further at an angle with respect to longitudinal axis 16 of the rail member M. As shown in FIG. 9, the securing members are substantially aligned with one another and parallel with the longitudinal axis 16 of the rail member M for making a rip-type cut. Irrespective of the positioning of the rail member M with respect to the workpiece W, the securing members S are always positioned on the finished cut portion 12a of the workpiece 12, with the discard portion 12b being in a position to fall off and being removed without risk of inadvertent cuts and damage to the finished cut portion 12a of the workpiece W. In all circumstances, it should be noted that the router trolley T with the router R therewith moves along the length of the rail member M in the direction of arrows 60 and is constrained to making a cut 62 an exact predetermined distance 64 for the longitudinal axis 16 of the rail member M. As such, the router R is prevented from wandering into or making any unwanted cuts on the finished cut portion 12a of the workpiece 12. The cut 62 will always be parallel to the longitudinal axis 16 of the rail member M and always spaced therefrom by the distance 64 (FIGS. 6-9).

It will be appreciated that in the event that a through cut (such as that shown in FIG. 3) is not desired and merely a router groove 12c as shown in FIG. 4 is desired, then the fact that the securing member is firmly securely affixed with the workpiece 12 prevents the router R from cutting in unwanted areas beyond the groove 12c because the router R is constrained from any movement other than that along the length of the rail member M.

In the typical scenario, the workpiece W is secured with the router guide assembly A of the present invention by means of the securing members S with the securing members S being mounted with the rail member M. Thereafter, the router R is initially vertically positioned by the adjustment mechanism 38 on the router trolley T to establish clearance gap 58 and thereafter is freely moveable along the rail member M in the direction of arrows 60. Movement of the router trolley T and the router R therewith along the length of the rail member M effectuates a router cutting operation on the workpiece W, with such cutting operation being parallel to the length of the rail member M and spaced apart therefrom by distance 64. Furthermore, in the use and operation of the router guide assembly A of the present invention, initial clamping of the workpiece W with the securing member S and thereafter being able to laterally adjust the workpiece W relative to the rail member M by the lateral adjustment mechanism L for final, precise positioning of the entire router guide assembly A with respect to the workpiece W results in precise alignment of the router bit 10e of the router 10 with the workpiece 12 during router operations. This permits the initial locating of the workpiece W with the jaw member 44 and workpiece clamp 46 and locking mechanism 48, with relative accuracy because of the swivel-type relationship that is effectuated between the track 42 and the lock fastener assembly 52. Upon initial positioning and preliminary locking therewith by tightening of the knob 52j, the final positioning is effectuated by rotating knob 54a of the adjusting rod 54 of the lateral adjustment mechanism L. The rotation of the knob 54a permits the lateral shifting of the entire jaw member 44, workpiece clamp 46 and lock housing 50, as the threaded action of the threaded shaft 54b coacts with the threaded opening 50f in the lock housing 50. The inner cavity 56c within guide bushing 56 permits lateral movement of the lock housing 50, jaw member 44, workpiece clamp 46 combination. As noted above, the router guide assembly A of the present invention also permits positioning of the router R along with the platform 32 above the upper surface 12d of the workpiece W by a clearance gap 58 which allows for the enhanced dispersion of debris generated by the cutting operations.

While preferably the router guide assembly A of the present invention is to be mounted with the finished cut portion of the workpiece W, in certain situations the router guide assembly A may be effectively used and mounted with the discard portion of the workpiece W.

Furthermore, the arrangement of the router trolley T on the rail member M of the router guide assembly A permits the router trolley T, during movement thereof for router operations, to pass over the securing member S, while such securing member S secures the rail member M to the workpiece W. Thus, the securing member S does not interfere in any manner with movement of the router trolley T along the length of the rail member M, even when located beneath the rail member M within the length of the cut 62.

Accordingly, the router guide assembly A of the present invention comprehends the direct securance of the workpiece W with the rail member M by virtue of the securing members S wherein a router trolley T constrains the router R for cuts 62 exactly along a predetermined line that is spaced from the longtitudinal axis 16 of the rail member M by distance 64, and is parallel thereto for permitting enhanced accuracy of router cuts while simultaneously virtually eliminating the possibility of erroneous router cuts to the workpiece W.

The foregoing disclosure and description of the invention are illustrative and explanatory thereof, and various changes in size, shape and materials, as well as in the details of the illustrated construction may be made without departing from the spirit of this invention.

I claim:

1. A router guide assembly for guiding a router over a workpiece for making a precise cut on the workpiece; comprising:
   a singular elongate rail member;
   a router trolley mounted for movement along the length of said rail member, said router trolley supporting the router to one side of said rail member for cutting operations on the workpiece; and,
   securing member affixed to said rail member for securing said rail member with the workpiece.

2. A router guide assembly for guiding a router over a workpiece for making a precise cut on the workpiece, comprising:
   an elongate rail member;
   a router trolley mounted for movement along the length of said rail member, said router trolley supporting the router for cutting operations on the workpiece, said router trolley including
      a trolley member for aligned movement along said rail member;
      a router support secured with said trolley member for receiving the router for mounting therewith and,
   securing member affixed to said rail member for securing said rail member with the workpiece.

3. The router guide assembly of claim 2, wherein said trolley member includes:
   a trolley member housing mounted about said rail member for movement along the length of said rail member; and,
   bearing means with said trolley member housing and interposed between said trolley member housing and said rail member for enhanced aligned movement of said trolley member housing along said rail member.

4. The router guide assembly of claim 3, wherein:
   said rail member is of a substantially rectangular cross-section in the plane substantially perpendicular to its length, said rail member having an upper surface, first and second side surfaces, and a lower surface; and,
   said trolley member housing includes an upper surface member for positioning substantially parallel with said upper surface, a first side surface member for positioning substantially parallel with said first side surface, a second side surface member for positioning substantially parallel with said second side surface, and a lower surface member for positioning substantially parallel with said lower surface.

5. The router guide assembly of claim 4, wherein said bearing means is interposed between said upper surface, said first and second side surfaces, and said lower surface of said rail member and said upper surface member, said first and second side surface members, and said lower surface member of said trolley member housing, respectively.

6. The router guide assembly of claim 2, wherein said router support includes:
   a platform having an upper platform surface and a lower platform surface, said platform for receivably mounting the router with said upper platform surface thereof; and,
   said platform formed having an opening extending between said upper and lower platform surfaces for receiving the bit of the router therethrough such that the bit of the router is extensible to a position beyond the lower platform surface of said platform for performing router operations on the workpiece.

7. A router guide assembly for guiding a router over a workpiece for making a precise cut on the workpiece, comprising:
   an elongate rail member;
   a router trolley mounted for movement along the length of said rail member, said router trolley supporting the router for cutting operations on the workpiece;

securing member affixed to said rail member for securing said rail member with the workpiece, said securing member including a clamp assembly mounted with said rail member for securing the workpiece with said rail member, said clamp assembly being rotatable about a vertical axis substantially perpendicular to the horizontal plane along the length of said rail member.

8. The router guide assembly of claim 7, wherein said securing member includes:

a track mounted with said rail member for receiving said clamp assembly, said clamp assembly being secured at selected positions along the length of said rail member, as desired.

9. The router guide assembly of claim 8, wherein said track is of a generally hollow cross-section in the plane perpendicular to the length of said rail member, with a track channel formed in one side of said track for receiving said clamp assembly for mounting therewith at desired positions along the length of said rail member.

10. The router guide assembly of claim 7, wherein said clamp assembly includes:

a jaw member for releasably securing the workpiece, said jaw member having first, second and third clamping portions, with said first and second clamping portions being substantially parallel to one another, said second clamping portion being secured to said first clamping portion by said third clamping portion, with the interior surfaces of said first, second and third clamping portions defining a jaw cavity for receiving the workpiece therein; and, a workpiece clamp mounted for movement with said second clamping portion for movement between a first, unsecured position where the workpiece is unsecured in said jaw cavity and a second, secured position where the workpiece is secured in said jaw cavity.

11. The router guide assembly of claim 7, wherein said clamp assembly includes:

a jaw member for releasably securing the workpiece; and, a locking mechanism interposed between said jaw member and said rail member, said locking mechanism being releasable between a locked position where said clamp assembly is secured from relative movement with respect to said rail member and an unlocked position where said clamp assembly may rotate with respect to said rail member.

12. The router guide assembly of claim 11, wherein said locking mechanism includes:

a lock housing mounted between said jaw member and said rail member; and, a lock fastener assembly with said rail member and extensible through said lock housing and engageable with said jaw member for movement thereof between said locked and unlocked positions.

13. The router guide assembly of claim 12, further including:

a track mounted with said rail member for receiving said clamp assembly, said clamp assembly being secured at selected positions along the length of said rail member, as desired; and, said lock fastener assembly having a head portion mountable with said track.

14. The router guide assembly of claim 12, further including:

a lateral adjustment mechanism with said lock housing for laterally adjusting the workpiece with respect to said rail member.

15. The router guide assembly of claim 14, wherein said lateral adjustment mechanism includes:

an adjusting rod threadedly mounted with said lock housing and in engagement with said lock fastener assembly such that threaded rotation of said adjusting rod with respect to said lock housing shifts said jaw member for lateral positioning of the workpiece with respect to rail member and said router trolley, as is desired.

16. The router guide assembly of claim 15, wherein said lateral adjusting mechanism includes:

a guide bushing for proper positioning of said jaw member with respect to said lock housing, a portion of said lock fastener assembly being positioned within an inner cavity formed in said guide bushing, said lock fastener assembly being laterally movable within said inner cavity of said guide bushing upon threaded movement of said adjusting rod.

17. A router guide assembly for guiding a router over a workpiece for making a precise cut on the workpiece, comprising:

an elongate rail member;

a router trolley mounted for movement along the length of said rail member, said router trolley supporting the router for cutting operations on the workpiece;

securing member affixed to said rail member for securing said rail member with the workpiece; and, a lateral adjustment mechanism with said securing member for laterally adjusting the workpiece with respect to said rail member.

18. The router guide assembly of claims 2, 7, or 17 further including:

an adjustment mechanism adjustably securing said router support with said trolley member for permitting relative movement of said router support with respect to said trolley member for proper positioning of the router relative to the surface of the workpiece, as is desired.

19. The router guide assembly of claim 18, wherein said adjustment mechanism includes:

at least one threaded opening formed in said trolley member;

at least one slot formed in said router support for alignment with said threaded opening; and, at least one fastening member extensible through said slot and thereinto said threaded opening for adjustably securing said router support with respect to said trolley member.

20. The router guide assembly of claims 2, 7, or 17 wherein:

the relative positioning of the router on said router trolley and the workpiece with said securing member results in the lower surface of said router trolley being suspended from the upper surface of the workpiece by a clearance gap.

21. The router guide assembly of claims 2, 7 or 17, wherein:

said router trolley is movable along said rail member without said securing member limiting any movement thereof.

22. A method for using a router on a workpiece for making a precise cut on the workpiece, comprising the steps of:

securing the workpiece to a securing member, the securing member being mounted with a singular elongate rail member;

positioning the router on a router trolley movably mounted on the rail member; and, moving the router trolley having the router therewith along the length of the rail member and to one side of the rail member for effectuating a router cutting operation on the workpiece, with such cutting operations being substantially parallel to the length of the rail member and spaced apart therefrom.

23. A method for using a router on a workpiece for making a precise cut on the workpiece, comprising the steps of:

securing the workpiece to a securing member, the securing member being mounted with an elongate rail member;

positioning the router on a router trolley movably mounted on the rail member;

moving the router trolley having the router therewith along the length of the rail member for effectuating a router cutting operation on the workpiece, with such cutting operations being substantially parallel to the length of the rail member and spaced apart therefrom;

said securing including the steps of clamping the workpiece with the securing member; and, thereafter laterally adjusting the workpiece relative to the rail member by a lateral adjustment mechanism with the securing member.

24. A method for using a router on a workpiece for making a precise cut on the workpiece, comprising the steps of:

securing the workpiece to a securing member, the securing member being mounted with an elongate rail member;

positioning the router on a router trolley movably mounted on the rail member;

moving the router trolley having the router therewith along the length of the rail member for effectuating a router cutting operation on the workpiece, with such cutting operations being substantially parallel to the length of the rail member and spaced apart therefrom;

said securing and said positioning resulting in the lower surface of the router being suspended from the upper surface of the workpiece.

25. A method for using a router on a workpiece for making a precise cut on the workpiece, comprising the steps of:

securing the workpiece to a securing member, the securing member being mounted with an elongate rail member;

positioning the router on a router trolley movably mounted on the rail member;

moving the router trolley having the router therewith along the length of the rail member for effectuating a router cutting operation on the workpiece, with such cutting operations being substantially parallel to the length of the rail member and spaced apart therefrom;

said securing including the step of swiveling the securing member with respect to the elongate rail member to permit enhances locating of the rail member, router trolley and router with respect to the workpiece to be cut.

26. A method for using a router on a workpiece for making a precise cut on the workpiece, comprising the steps of:

securing the workpiece to a securing member, the securing member being mounted with an elongate rail member;

positioning the router on a router trolley movably mounted on the rail member;

moving the router trolley having the router therewith along the length of the rail member for effectuating a router cutting operation on the workpiece, with such cutting operations being substantially parallel to the length of the rail member and spaced apart therefrom;

said moving permitting the router trolley to move along the length of the rail member without interference from the securing member.

27. The method of claim 25, further including the step of:

locking the securing member in the desired position with a locking mechanism after said swiveling.

28. The method of claims 22, 23, 24, 25 or 26, wherein:

said securing of the workpiece with the securing member includes the steps of locating the securing member beneath the rail member and within the length of the cut.

* * * * *